(12) United States Patent
Kakadia et al.

(10) Patent No.: US 10,237,192 B2
(45) Date of Patent: Mar. 19, 2019

(54) APPARATUS AND SYSTEM FOR OPTIMIZING COMMUNICATION NETWORKS

(71) Applicant: Google Inc., Mountain View, CA (US)

(72) Inventors: Deepak Kakadia, Santa Clara, CA (US); Richard Hay, Austin, TX (US); Roman Kononov, Mountain View, CA (US); Glenn Brown, Gilroy, CA (US)

(73) Assignee: Google LLC, Mountain View, CA (US)

( * ) Notice: Subject to any disclaimer, the term of this patent is extended or adjusted under 35 U.S.C. 154(b) by 37 days.

(21) Appl. No.: 15/364,171

(22) Filed: Nov. 29, 2016

(65) Prior Publication Data

US 2018/0152384 A1  May 31, 2018

(51) Int. Cl.
*H04L 12/851* (2013.01)
*H04L 12/26* (2006.01)
*H04L 12/24* (2006.01)
*H04L 12/751* (2013.01)

(52) U.S. Cl.
CPC ............ *H04L 47/24* (2013.01); *H04L 41/142* (2013.01); *H04L 43/026* (2013.01); *H04L 43/06* (2013.01); *H04L 43/0852* (2013.01); *H04L 43/0876* (2013.01); *H04L 43/106* (2013.01); *H04L 43/12* (2013.01); *H04L 43/00* (2013.01); *H04L 45/02* (2013.01)

(58) Field of Classification Search
None
See application file for complete search history.

(56) References Cited

U.S. PATENT DOCUMENTS

| 6,363,056 B1* | 3/2002 | Beigi ............... H04L 41/12 370/252 |
| 9,787,559 B1* | 10/2017 | Schroeder ......... H04L 41/5038 |
| 2004/0109455 A1* | 6/2004 | Jouppi ............... H04W 28/24 370/395.52 |
| 2006/0072565 A1 | 4/2006 | Yazaki et al. |

(Continued)

OTHER PUBLICATIONS

International Search Report and Written Opinion dated Jan. 30, 2018 in International (PCT) Application No. PCT/US2017/063286.

(Continued)

*Primary Examiner* — Faruk Hamza
*Assistant Examiner* — Cassandra L Decker
(74) *Attorney, Agent, or Firm* — McDermott Will & Emery LLP (57) ABSTRACT

A network monitoring apparatus and system are disclosed to detect quality of service indicator values in headers of packets received via a network port. Based on detecting the quality of service indicators values, the apparatus and system maintain, for each of a plurality of quality of service indicator values, a count of the number of packets having the respective quality of service indicator value. The apparatus and system further maintain, for each of the plurality of quality of service indicator values, a total volume of network traffic having the respective quality of service indicator value. The packet counts and total network traffic volumes are output to a host processor. The host processor, in response to receiving the packet counts and network traffic volumes, transmits the packet counts and network traffic volumes to a network controller.

12 Claims, 7 Drawing Sheets

(56) References Cited

U.S. PATENT DOCUMENTS

| | | | |
|---|---|---|---|
| 2008/0049640 A1* | 2/2008 | Heinz | H04L 41/0806 370/252 |
| 2009/0028554 A1* | 1/2009 | Anderson | H04L 7/0054 398/25 |
| 2012/0278477 A1* | 11/2012 | Terrell | H04L 41/5009 709/224 |
| 2014/0029449 A1* | 1/2014 | Xu | H04L 43/10 370/252 |
| 2014/0056234 A1* | 2/2014 | Hedlund | H04W 24/02 370/329 |
| 2014/0092753 A1 | 4/2014 | Vasseur et al. | |
| 2014/0297846 A1* | 10/2014 | Hoja | H04L 43/10 709/224 |
| 2015/0181459 A1 | 6/2015 | Zhu | |
| 2016/0248577 A1* | 8/2016 | Ilyas | H04L 7/02 |
| 2018/0131591 A1* | 5/2018 | Toomey | H04L 43/04 |

OTHER PUBLICATIONS

International Preliminary Report on Patentability under Chapter II dated Oct. 30, 2018 in PCT Application No. PCT/US2017/063286 (17 pages).

\* cited by examiner

| | 00000000 01234567 | 00111111 89012345 | 11112222 67890123 | 22222233 45678901 |
|---|---|---|---|---|
| 0 | End of New Packet Preamble and Delimiter Bits | | MAC Destination Address (6 Bytes) | |
| 1 | MAC Destination (Continued) | | | |
| 2 | MAC Source Address (6 Bytes) | | | |
| 3 | MAC Source Address (Cont.) | | Ethertype | |
| 4 | IP Ver. | IHL (Length) | DSCP (QoS) | ECN | Packet Length |
| 5 | Identification | | Flags | Fragment Offset |
| 6 | Time to Live (TTL) | | Protocol | Header Checksum |
| 7 | Source IP Address | | | |
| 8 | Destination IP Address | | | |
| 9 | Source Port | | Destination Port | |
| 10 | Sequence Number | | | |
| 11 | Acknowledgment Number | | | |
| 12 | Data Offset | Not Used | Control Flags | Window Size |
| 13 | Checksum | | Urgent Pointer / Options / Zero Pad | |
| 14 | Begin Data ... | | | |

APPARATUS AND SYSTEM FOR OPTIMIZING COMMUNICATION NETWORKS

BACKGROUND

A communication network consists of a collection of nodes interconnected with links to enable communication and signal passing between nodes. Data transmitted over links may include voice, video, messages as well as gaming or interactive data. Operators of service provider networks seek to optimize network availability and transport capacity to ensure adequate network resources are available to deliver data at the appropriate quality of experience anticipated by customers. Generally, these network characteristics are managed independent of each other, often utilizing different tools, methods and measurement data. In such situations, analysis of network traffic measurement and monitoring data may be performed with varying levels of accuracy, resulting in disparate optimizations of network resources that can adversely affect the quality of a customer's experience utilizing the network.

SUMMARY

Aspects and implementations of the present disclosure are directed to an apparatus and system for optimizing communication network resources based on network monitoring measurements. Network monitoring measurement data is received by a network monitoring apparatus and evaluated in relation to quality of service indicators of the measurement data. The network monitoring apparatus maintains counts of received packets, as well as, maintaining a total volume of network traffic that is being transmitted across a node in a segment or link of the communication network. The network monitoring apparatus further identifies probe packets used to measure the latency of segments or links in the communication network that may be associated with queue behavior of a particular node or device. The network monitoring apparatus may be included in a system further including a network controller. The network controller may receive the packet counts and total network traffic volumes and determine an updated routing topology necessary to maintain network availability and capacity in relation to the quality of service indicators of the traffic passing through the network segments.

In one aspect, the disclosure relates to an apparatus. The apparatus includes a network interface card including a network port configured to receive a network cable. The apparatus includes an integrated circuit processor configured to detect quality of service indicator values in headers of packets received via the network port. The integrated circuit processor is further configured to maintain for each of a plurality of quality of service indicator values a count of the number of packets having the respective quality of service indicator value received at the network interface card. The integrated circuit processor is configured to maintain for each of the plurality of quality of service indicator values a total volume of network traffic having the respective quality of service indicator value received at the network interface card. The integrated circuit processor is further configured to output the packet counts and total network traffic volumes.

In another aspect, the disclosure relates to an apparatus. The apparatus includes a network interface card including a network port configured to receive a network cable. The apparatus includes an integrated circuit processor configured to detect quality of service indicator values in headers of packets received via the network port. The integrated circuit processor is further configured to maintain for each of a plurality of quality of service indicator values a count of the number of packets having the respective quality of service indicator value received at the network interface card. The integrated circuit processor is configured to maintain for each of the plurality of quality of service indicator values a total volume of network traffic having the respective quality of service indicator value received at the network interface card. The integrated circuit processor is further configured to output the packet counts and total network traffic volumes. The network monitoring apparatus further includes a host processor configured to execute computer instructions stored in memory wherein the computer executable instructions when executed by the host processor cause the processor to collect the packet counts and total network traffic volumes output by network interface card and further cause the outputted packet counts and total network traffic volumes to transmitted to a network controller.

In one aspect, the disclosure relates to a system that includes a network monitoring apparatus monitoring a link between nodes in an optical communication network. The network monitoring apparatus includes a first network interface card including a first network port for receiving a first network cable and a second network interface card having a second network port for receiving a second network cable. Each of the first and second network interface cards includes a respective integrated circuit processor configured to detect quality of service indicator values in headers of packets received via the first or second network port. Each of the first and second network interface cards is further configured to maintain for each of a plurality of quality of service indicators at least one of a packet count or a total network traffic volume having the respective quality of service indicator value received at the first or second network interface card. Each of the first and second network interface cards is further configured to output the packet counts and total network traffic volumes. The network monitoring apparatus further includes a host processor configured to execute computer instructions stored in memory wherein the computer executable instructions when executed by the host processor cause the processor to collect the packet counts and total network traffic volumes output by the first and second network interface cards and transmit the packet counts and total network traffic volumes to a network controller. The network monitoring apparatus further includes a network controller configured to receive the outputted packet counts and total network traffic volumes.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

A network monitoring apparatus may be deployed in a communication network to receive packets and determine network traffic measurements. The network monitoring apparatus may function as a network tap and evaluate packets transmitted over an optical fiber without breaking the connection the optical fiber provides between nodes in the network. In some instances, network traffic may be monitored by the network monitoring apparatus for packets transmitted to or from a data center, network operations center, or any other node in a network. Transmitted packets may contain an identifier, for example, in a differentiated services field in the packet header. The differentiated services field is often used to classify the packet according to a particular quality of service (QoS) and is intended to refer to how the packet should be prioritized for forwarding and routing through the communication network. Nodes in the network (e.g., switches, routers, optical network devices) are configured to differentiate traffic based on the QoS classification to enable class-specific management of traffic and provide special handling for packets with high-priority classifications.

Measurements of network capacity may be obtained by maintaining counts of packets and total network traffic volumes for packets transmitted with a particular QoS classification. Measurements of network latency may be obtained by deploying probe packets, also with a particular QoS classification, into the network that contain an identifier, for example, in the protocol identifier field of the packet header, indicating the packet is a probe packet. Alternatively, the probe identifier may be included at or near the beginning of the payload of the packet. The network monitoring apparatus may identify the packet as a probe packet based on finding the probe packet identifier in the protocol identifier field or the probe packet payload. The identified probes may also contain a QoS indicator value (e.g., a differentiated services field value) that is associated with a type of content and the desired transport behavior between nodes in the network.

The network monitoring apparatus may maintain counts of all packets and total traffic volume measurements for each QoS indicator value associated with the packets transmitted through the network. The maintained counts and traffic volume measurements may then be output to a host processor in the network monitoring apparatus. The host processor may further cause the outputted packet counts and total network traffic volume measurements to be transmitted to a network controller. Upon receiving the transmitted packet counts and total network traffic volumes, the network controller may evaluate the packet counts and total network traffic volumes to evaluate network performance for each QoS indicator value, and in response, determine an updated network topology to yield improved performance for packet flows marked with one or more of the QoS indicator values. In some instances, determining an updated network topology may include adjusting bandwidth between network links or otherwise optimizing network resources.

In some implementations, the network monitoring apparatus may include an integrated circuit processor, for example, included within a network interface card (NIC) of the network monitoring apparatus, configured to identify probe packets by matching a stored bit pattern to a value in a header field, such as a value in the protocol field of the received packets. Additionally, or alternatively, the integrated circuit processor may be further configured to compare QoS indicator values in the received packet headers to a predetermined set of QoS indicator values. The integrated circuit processor may evaluate received packets matching the predetermined set of QoS indicator values in order to collect network traffic measurements for a particular type of packet, such as packets associated with voice, video, streaming music, web pages or email. In some implementations, the integrated circuit processor may be further configured with a hardware comparator to evaluate and compare packet header field values to the predetermined set of QoS indicator values.

In some implementations, the integrated circuit processor may be configured to apply a time stamp to packets identified as probe packets and pass the time-stamped probe packets up a protocol stack of the network monitoring apparatus. The time-stamped probe packets or information about the packets, including the time stamps, can be forward to a network controller for further evaluation of network latencies and user experience.

Figure 1:
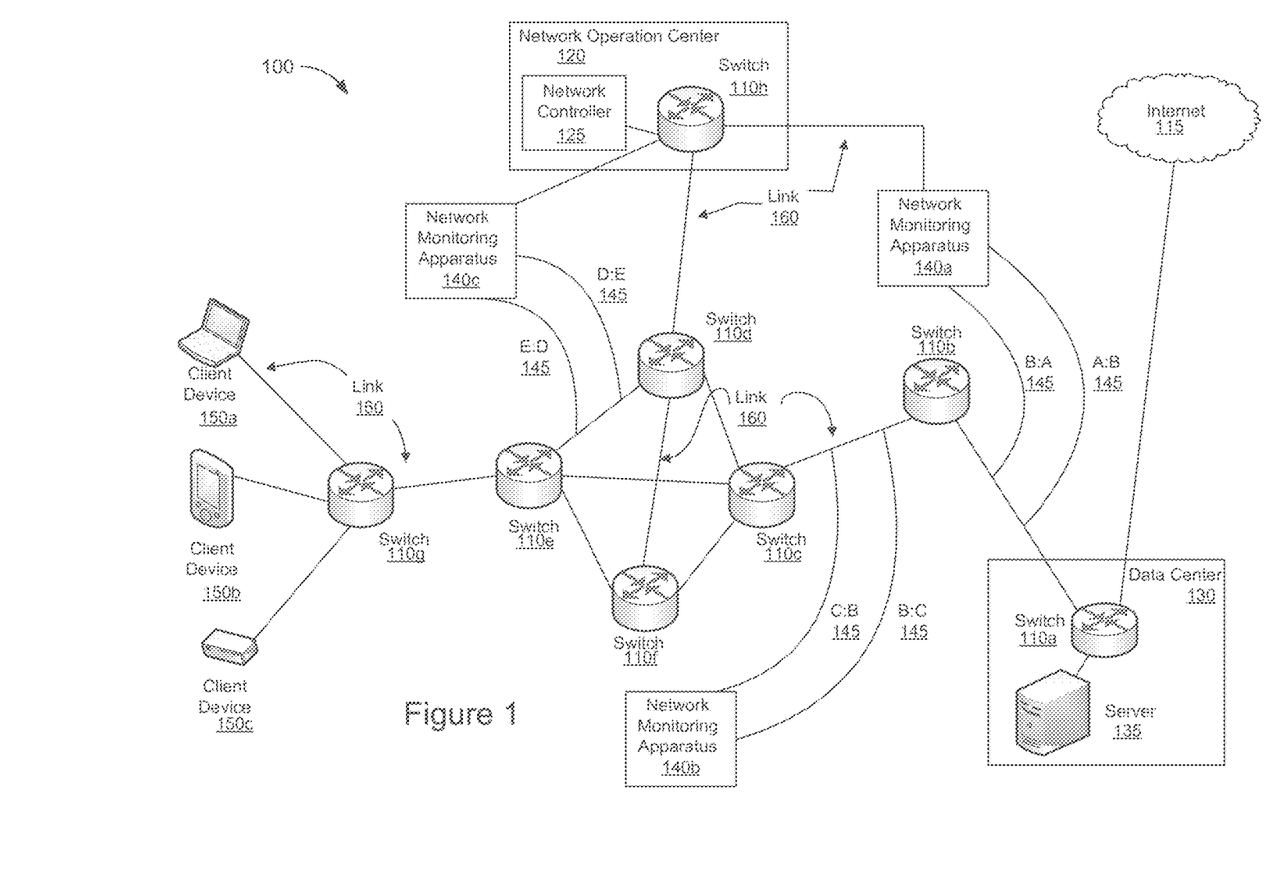
FIG. 1 is a diagram of an example communication network environment.

FIG. 1 is a block diagram of an example communication network environment. In broad overview, the illustrated communication network environment 100 includes client devices 150a-150c (generally client devices 150), a data center 130 and a network operation center 120. The communication network environment 100 may further include a connection to the Internet 115. The client devices 150, data center 130, the network operation center 120, and the Internet 115 are connected by a series of switches 110a-110h (generally switches 110) and links 160. Also included in the example communication network environment 100 are network monitoring apparatuses 140a-140c (generally network monitoring apparatus 140). The network monitoring apparatuses 140 monitor network traffic via monitoring links 145 by evaluating packets transmitted between switches 110 on the links 160.

Referring to FIG. 1, in more detail, the communication network environment 100 includes one or more switches 110 (e.g., switches 110a-110h) interconnected by links 160 to pass data and network traffic through the network. Switches 110 may include optical packet switches which enable signals and data in optical fibers to be selectively switched from one node to another in a communication network. Optical packet switches 110 may be configured with a classifier to evaluate headers of packets received at the switch 110 and to assign the received packets to one or more QoS-based queues, based on QoS indicator values included in the packet headers. In some implementations, one or more of the switches 110 can be routers. In some implementations, one or more of the switches 110 can be software defined networking (SDN) switches, controlled by a network controller 125, included, for example, in the network operation center 120. In some implementations, the communication network environment 100 includes additional network devices, such as optical hubs, bridges or optical circuit switches and/or additional electrical packet switches, crossbar switches, hubs, and bridges, which connect the switches 110, the Internet 115, the network operations center 120, and the data center 130.

As further shown in FIG. 1, the communication network environment 100 includes a network operation center 120. The network operation center 120 provides monitoring and control of the communication network 100 to provide improved availability of network content and resources. For example, network operation center 120 may monitor a communication network for power failures, link alarms or failures, or performance issues affecting delivery of packets through the communication network. The network operation center 120 includes a network controller 125 connected to the switch 110h. In some implementations, the network controller is a SDN network controller configured to provide forwarding and configuration data to one or more of the switches 110. The network controller 125 can include a control module and memory, e.g., for storing switch configuration and routing data.

In some implementations, the network controller 125 may generate probe packets to be distributed though the communication network via the switch 110h to measure per segment latencies for a particular class of QoS data. In some implementations, the network controller 125 generates and transmits instructions to other nodes in the networks to generate and transmit probe packets through the network environment 100. For example, each node in a network may generate a configuration file including instructions that identify network endpoints to which probes packets should be sent in order to collect measurement data for all network segments. The configuration file may also include QoS indicator values to include in each of the respective probe packets.

The network controller 125 may further communicate with the network monitoring apparatus 140 through links 160 to receive packet counts, total network traffic volumes, and network monitoring data. Network availability and capacity may be measured by probe packets that are sent and received by nodes in the communication network environment 100. The network controller 125 can receive the measurement data and evaluate network latencies on the basis of each segment and the QoS indicator values of transmitted packets. For example, the network controller 125 may receive packet counts from one or more network monitoring apparatus 140 and determine that an updated routing topology is required to deliver packets identified with a particular QoS indicator value. For example, the measurement data collected from the network monitoring apparatus 140 may indicate that packet departure rates or a packet backlog at a given switch 110 has surpassed desired latency and/or capacity specifications for processing packets identified with a particular QoS indicator value. Based on determining the updated routing topology, the network controller 125 can transmit control data via control link 160 to adjust link bandwidth for segments connected to the switch 110 in question in order to achieve improved latencies for the particular class of QoS packets transmitted through the switch 110. For example, if the switch 110 employs wavelength division multiplexing, or dense wavelength division multiplexing, the network controller 125 can instruct the switch to assign an additional transmission wavelength to transmissions between that switch 110 and an adjacent switch 110, over which a larger amount of traffic with the particular QoS indicator value is routed.

Still referring to FIG. 1, the communication network environment 100 includes the data center 130. The data center 130 may include one or more servers (e.g., application servers, data servers, or any other type of server) configured to provide data and application content via the communication network environment 100. The data center 130 includes a server 135. The server 135 is an information source, e.g., a source that originates a flow of data to be transmitted through the communication network to client devices 150. The server 135 is linked to switches 110 in the data center 130 to provide application data (e.g., voice, video, gaming content) to client devices 150. Additionally, or alternatively, the data center 130 may generate probe packets to be distributed though the communication network via switch 110a to measure per segment latencies for packets with a particular QoS indicator value. In this way, latency can be determined in regard to a particular switch 110 to pinpoint the queue behavior which may be causing segment latency to drop below the desired latency specification for packets of a particular QoS indicator value. In some implementations, each server 135 is a physical computing device including memory, one or more processors, and a network interface. In some implementations, a server 135 may be a virtual machine or a containerized server.

FIG. 1 further depicts one or more network apparatus 140. The network monitoring apparatus 140 are deployed in the communication network between switches 110 to tap links 160 for packets transmitted through communication network 100. In some implementations, a network monitoring apparatus 140 is coupled to each and every link 160 connecting two switches 110 together (referred to as inter-switch links 160). In some implementations, a network monitoring apparatus is coupled to only a subset of the inter-switch links 160. In some implementations, each network monitoring apparatus 140 is coupled to a single link. In some implementations, one or more network monitoring apparatus 140 may each be coupled to multiple inter-switch links 160. In some implementations, a network apparatus 140 is coupled to each inter-switch link 160 using two separate monitoring links 145, with the two monitoring links 145 coupling to the inter-switch link 160 using optical taps configured to tap network traffic travelling in opposite directions, so that one monitoring link 145 taps traffic travelling in a first direction between two switches 110 and the other monitoring link 145 taps traffic travelling in a second, opposite direction between the two switches 110.

For example, the network monitoring apparatus 140a is deployed in communication network 100 to tap the link 160 carrying network traffic to and from 110b. Packets sent from switch 110a to switch 110b through link 160 are collected by the monitoring link $145_{A:B}$ and evaluated by network monitoring apparatus $140_a$ to determine the traffic levels from switch 110a to 110b, and to determine segment capacity and queue behavior of switch 110a and switch 110b. Similarly, network traffic passing through link 160 from switch 110b to switch 110c is collected by link $145_{B:C}$ and evaluated for by network monitoring apparatus $140_b$. The network monitoring apparatus $140_c$ may utilize link $145_{D:E}$ to detect packets, including probe packets, passing between switch 110d and switch 110e and maintain a count of packets and a total volume of network traffic, for each of a plurality of quality of service indicators associated with the detected packets.

The network monitoring apparatus 140 may detect QoS indicator values in packets received and maintain packet counts and total network traffic volumes for transmitted packets containing the respective QoS indicator value. Network monitoring apparatus 140 may further identify probe packets, also containing a QoS indicator value, by matching a stored bit pattern to a value in a header field of the received packet. For example, the network monitoring apparatus $140_a$ may identify a probe packet based on an identifier (referred to as a probe identifier), for example, in the protocol identifier field of the packet header, that matches a specific bit pattern stored in memory of the network monitoring apparatus. In some implementations, the identifier indicating that the packet is a probe packet can be "OXFFFF FFFF", though other values that do not already have other defined meanings can be used without departing from the scope of the invention. In some implementations, the probe identifier is included in the payload of the packet instead of in the header field.

Figure 2:
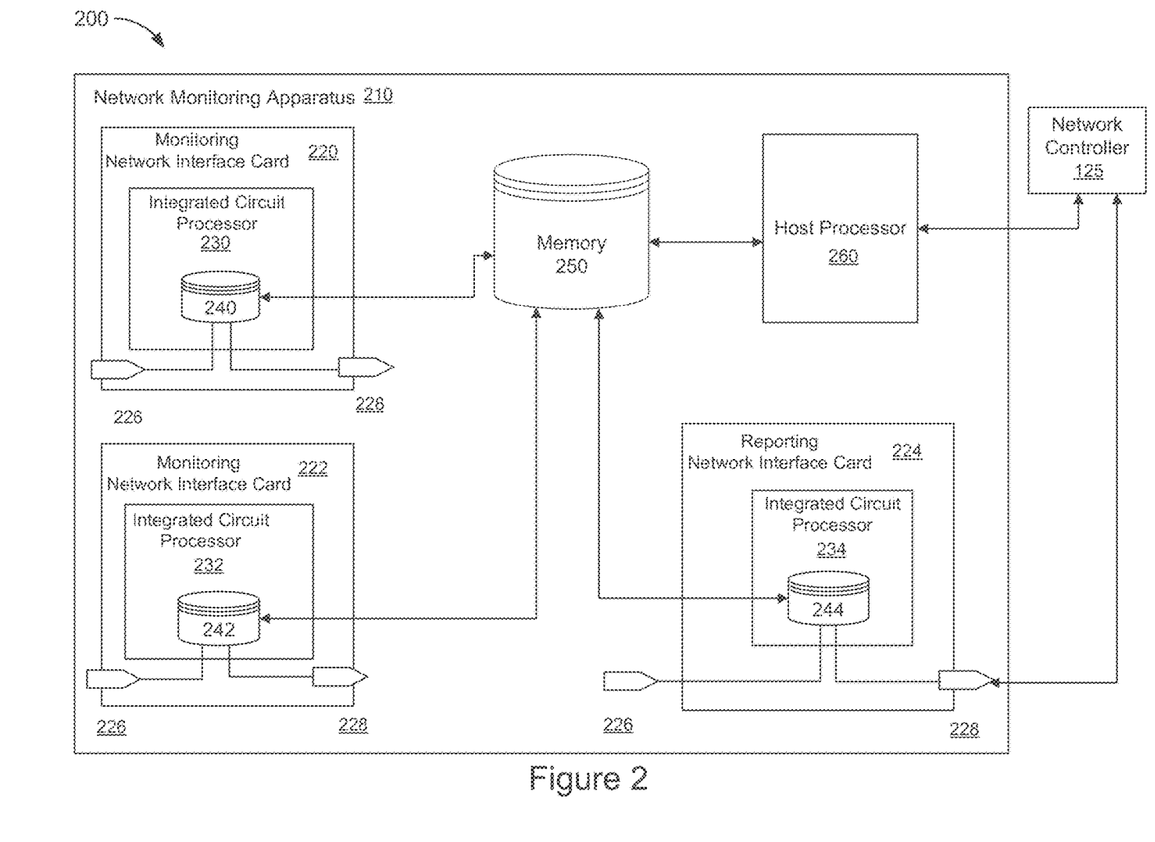
FIG. 2 is a block diagram of a network monitoring apparatus.

The network monitoring apparatuses 140 each include a host processor capable of storing and executing computer implemented instructions, as illustrated in FIG. 2. The computer implemented instructions, when executed by the host processor, cause the host processor to collect the maintained packet counts and total network traffic volumes and transmit the packet counts and total network traffic volumes to the network controller 125 utilizing the links 160. The instructions may further cause the host processor to collect and send to the network controller 125 information derived from identified probe packets. The network controller processes the received information to determine an updated routing topology for the communication network.

Figure 7:
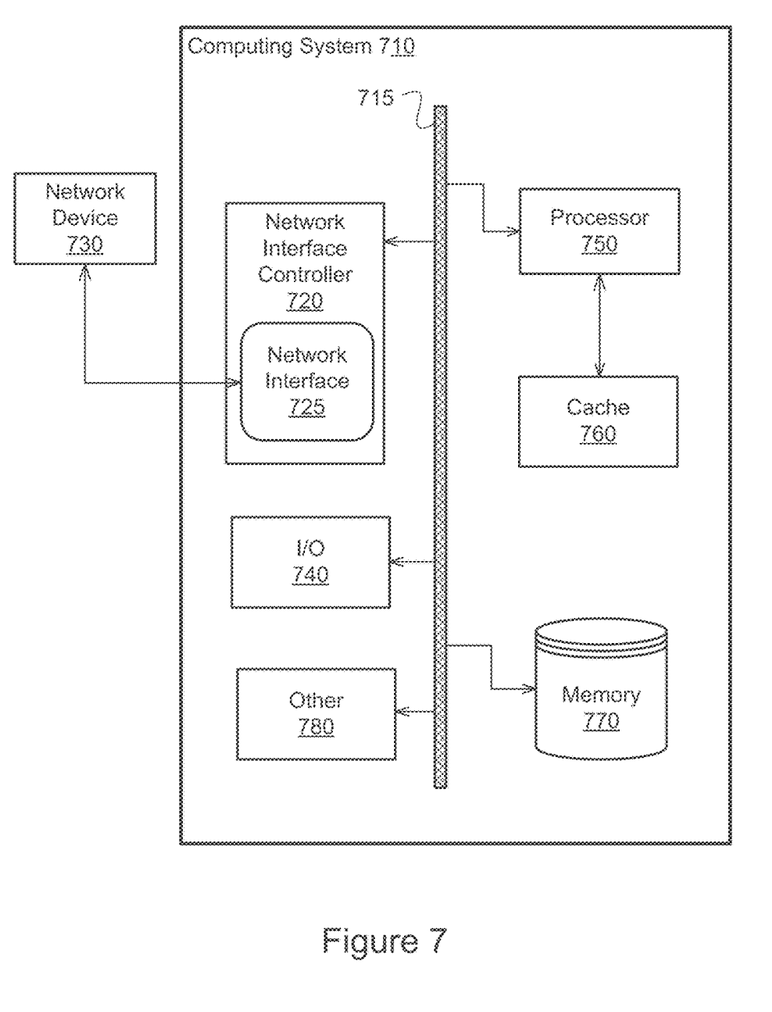
FIG. 7 is a block diagram of a computing system in accordance with an illustrative implementation.

Further, FIG. 1 includes one or more client devices 150. The client devices 150 can be any computing device or system capable of receiving packets from the switch 110. Users receive data from the switch 110 at the client devices 150 via a link 160. For example, a user of client device 150a may receive a video stream from a server 135. The client device 150 may be a laptop computer or a mobile device such as a cellular phone, smart phone or tablet. In some implementations, the client device 150 can be a television set-top box, a gaming device, or an entertainment appliance. The client devices 150 can be any computing device configured for access to a network. The client devices 150 may be multi-purpose devices or a comparatively limited specific-purpose device. In some implementations, a client device 150 is a physical computing device including memory, one or more processors, and a network interface, e.g., as illustrated in FIG. 7.

The links 160 included in the communication network environment 100 may include data plane links and control plane links. A data plane link carries user and application data through switches 110. The data traffic in the communication network is transmitted between network nodes, e.g., switches 110, using the links 160 and thereby forming a data plane. The links 160 may also connect network monitoring apparatus 140 to one or more switches 110 to provide packet counts, total network traffic volumes, and probe packet data, to network controller 125. The links 160 may also include control plane links to carry control messages in the communication network. Control plane links function to create or maintain network topology. Control plane logic determines how best to direct network traffic by utilizing routing protocols. Control plane logic can also define when to discard certain packets or when to handle certain packets as high-priority based on QoS indicator values defined by the differentiated services field of packet headers. The network controller 125 can distribute updated routing and network topology information over controls plane links to manage network devices, e.g., switches 110. In some communication network environments, the control plane and data plane share the same physical links. In some communication network environments, the control plane and data plane use separate physical links. In some communication network environments, some links serve as shared control plane and data plane links, whereas other links are dedicated to either the control plane or data plane.

FIG. 2 is a block diagram of network monitoring apparatus 210 which includes a monitoring network interface card 220, a monitoring network interface card 222, a reporting network interface card 224, a memory 250 and a host processor 260. The functionality of various components in FIG. 2 will be described further in relation to FIGS. 4-6.

As further shown in FIG. 2, the network monitoring apparatus 210 includes two monitoring network interface cards (e.g., 220 and 222), and a reporting network interface card 224. The monitoring network interface cards 220 and 222 and reporting network interface card 224 are each capable of supporting optical fiber channels transmitting data frames at rates that may reach 100 gigabits per second. In some implementations, the network monitoring apparatus 210 may include one or more monitoring network interface cards 220 and 222. In some implementations, the reporting network interface card 224 may be configured for lower speed communications, for example over copper (or other metal) wire, a wireless channel, or other electrical communication medium. In some implementations, the network monitoring device 210 may include one or more reporting network interface cards 224.

Referring to FIG. 2, in more detail, the monitoring network interface cards 220 and 222 and reporting network interface card 224 each include an input port 226 to receive a network cable. As further indicated in FIG. 2, the monitoring network interface cards 220 and 222 and reporting network interface card 224 include an output port 228.

FIG. 2 further depicts the monitoring network interface cards 220 and 222 including integrated circuit processors 230 and 232, respectively. FIG. 2 also depicts the reporting network interface card 224 including the integrated circuit processor 234. The integrated circuit processors 230-234 are a class of hardware chip or microchip that include one or more transistors, resistors and capacitors arranged as an electronic circuit on a piece of silicon or other semiconductor material to perform a particular function. For example, integrated circuit processors 230-234 may be classified as analog, digital or mixed (e.g. both analog and digital) circuit types, depending on the intended application. A digital integrated circuit processor operates using a small number of defined levels or states. For example, a digital integrated circuit processor utilizes logic gates to enable operation with binary data, where data signals typically have only two different states (e.g. 0 or 1). In some implementations, the integrated circuit processors 230 and 232 may include a hardware comparator to identify probe packets by comparing a protocol identifier in the received header packet to a specific bit pattern stored in the memory 240. Additionally or alternatively, the integrated circuit processors 230 and 232 may include a hardware comparator to compare portions of the received packet headers to a predetermined set of QoS indicator values. The integrated circuit processors 230 and 232 may further include hardware counters to maintain packet counts and total network traffic volumes. In some implementations, integrated circuit processors 230 and 232 may achieve line-rate processing of the received packets. In some implementations, the integrated circuit processors 230 and 232 are configured to implement the process stages 410, 420, 430 and 440 shown in FIG. 4, which are discussed further below, as well as the process stages shown in FIG. 6, also discussed further below.

FIG. 2 further depicts the integrated circuit processors 230-234 including memory 240-244, respectively, to store computational or operational data related to the function of the integrated circuit processor. In some implementations, the memory 240-244 may include a high-speed buffer to compensate for the differences in the rate at which packets are received at the network interface card and the rate at which the packets can be processed by the integrated circuit processors 230-234. The memory 240-244 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The network monitoring apparatus 210 includes a memory 250. The memory 250 may store data and/or instructions related to the operation and use of the network monitoring apparatus 210. The memory 250 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In some implementations, the memory 250 stores computer executable instructions, which when executed by the host processor, cause the host processor to carry out at least the process stages 440 and 450 shown in FIG. 4, which are described further below.

As further shown in FIG. 2, network monitoring apparatus 210 includes a host processor 260. The host processor 260 is a processor capable of interpreting and/or executing instructions, stored, for example in the memory 250. For example, host processor 260 may include a general-purpose processor, a microprocessor, a data processor, a GPU, a processing core, an ASIP, SOC, a PLD, and/or a chipset.

Although FIG. 2 shows example components of network monitoring apparatus 210, in some implementations, network monitoring apparatus 210 may include additional components, fewer components, different components, or differently arranged components than those depicted in FIG. 2. Additionally, or alternatively, one or more components of network monitoring apparatus 210 may perform one or more tasks described as being performed by one or more other components of network monitoring apparatus 210.

Figure 3:
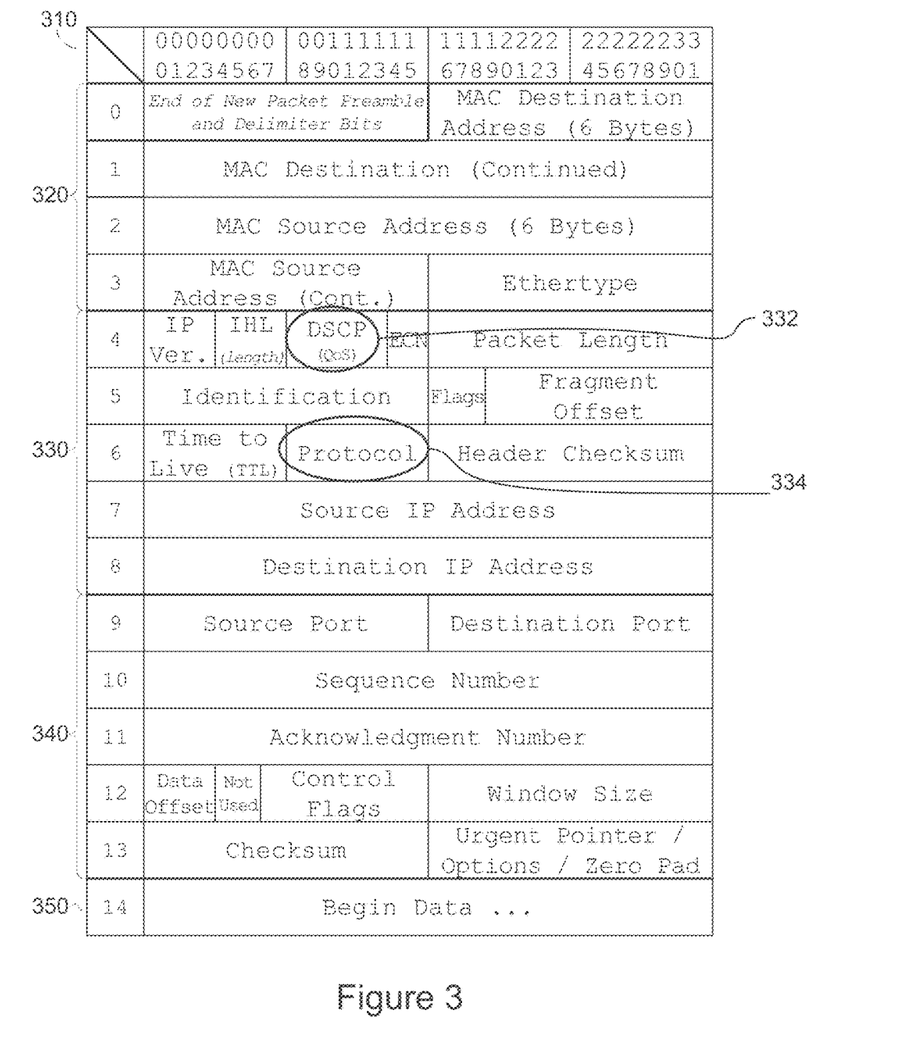
FIG. 3 is the layout for a typical TCP/IPv4 packet header.

FIG. 3 shows the format 310 for the headers of a typical TCP/IPv4 packet transmitted via Ethernet. In broad overview, the illustrated format includes an Ethernet frame 320, an Internet Protocol (IP) version 4 header 330, a transmission control protocol (TCP) header 340, and the beginning of the encapsulated data 350, i.e., the payload.

Referring to FIG. 3 in more detail, a TCP/IPv4 packet begins with a new packet preamble and delimiter 310, most of which is not shown. After the delimiter, an Ethernet frame header 320 includes a media access control (MAC) address for the packet's immediate destination (i.e., the network device or switch next receiving the packet) and a MAC address for the packet's immediate source (i.e., the network device or switch transmitting the packet). The Ethernet frame header 320 also includes a 16-bit "Ethertype" indicator, which indicates the size of the frame or the protocol for the Ethernet payload. The Ethernet frame header 320 is followed by the Ethernet payload 330, which begins with a header for the encapsulated packet. This is illustrated in FIG. 3 as an IPv4 header 330. The differentiated services code point (DSCP) field 332, also known as the QoS field or type of service (ToS) field, is used to represent the packet's traffic class and the priority that the packet should receive when transmitted through the network. An IPv6 packet header has a "Traffic Class" field that is similar to the IPv4 DSCP field.

The protocol field 334 defines the layout of the header that will immediately follow the IPv4 or IPv6 header.

After the IPv4 header 330, FIG. 3 shows a TCP header 340. The typical TCP header begins with a 16-bit source port identifier and a 16-bit destination port identifier. The TCP header 340 then specifies sequencing information including a sequence number for the packet, an acknowledgement number, and a data offset. The TCP header 340 includes control flags, e.g., SYN, FIN, and ACK, and additional control information such as the window size, a checksum, and other options. The packet data or payload 350 begins after the TCP header 340. While a packet configured according to IPv4 is shown for illustrative and explanatory reasons, a person of ordinary skill in the art would appreciate the subject matter disclosed herein could be employed with networks communicating according to IPv6, a combination of IPv4 and IPv6, or other protocols.

Figure 4:
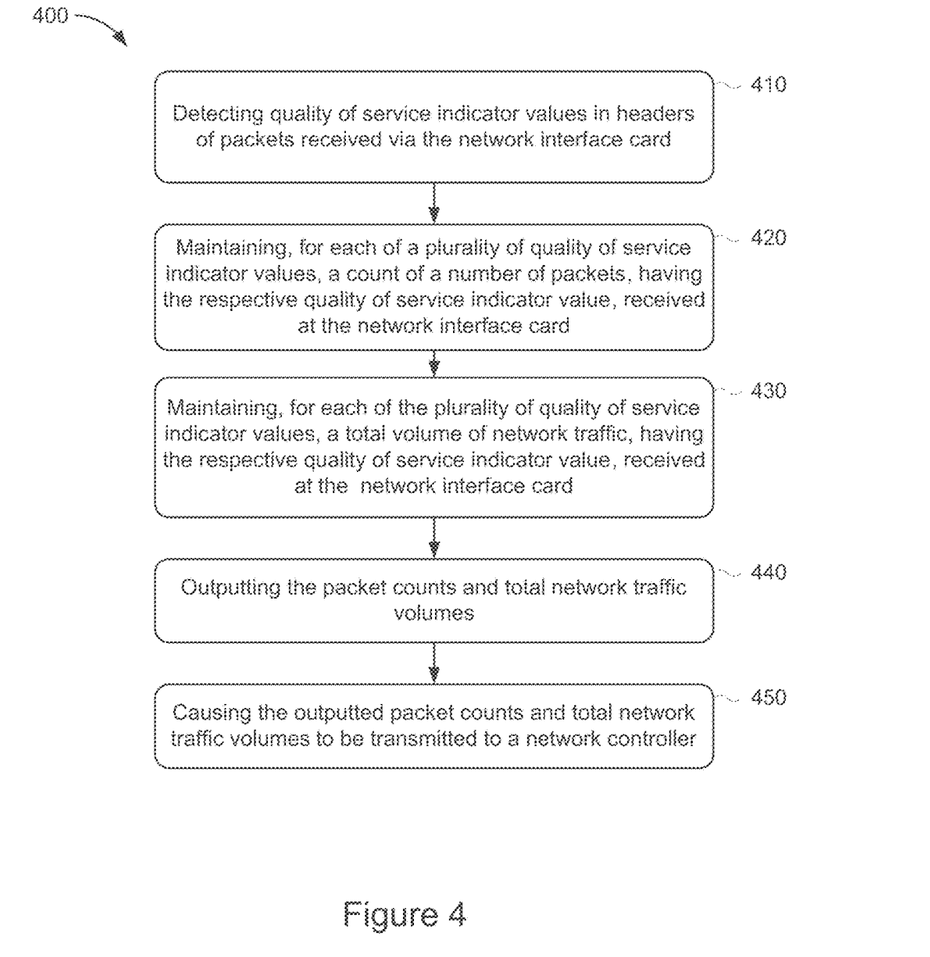
FIG. 4 is a flowchart for a network monitoring apparatus maintaining and outputting packet counts and total network traffic volumes.

FIG. 4 is a flowchart of a method 400 for collecting traffic volume statistics that can be implemented by a network monitoring apparatus (e.g. the network monitoring apparatus 210 of FIG. 2). The method 400 includes detecting QoS indicator values in headers of packets received via the network interface card (stage 410) and maintaining, for each of a plurality of quality of service indicator values, a count of a number of packets, having the respective quality of service indicator values, received at the network interface card (stage 420). The method 400 further includes maintaining, for each of the plurality of quality of service indicator values, a total volume of network traffic, having the respective quality of service indicator level, received at the network interface card (stage 430) and outputting the packet counts and total traffic network volumes (stage 440). The method 400 also includes causing the outputted packet counts and total network traffic volumes to be transmitted to a network controller (stage 450).

The method 400 includes the network monitoring apparatus 210 detecting QoS indicator values in the headers of the packets received via a port of a network interface card (stage 410). In some implementations, the network monitoring apparatus 210 may detect QoS indicator values in the headers of probe packets, as well as traditional data packets, received via a port of a network interface card. The network monitoring apparatus 210 may be further configured to compare portions of the packet headers and/or probe packet headers to a predetermined set of QoS indicator values stored in a plurality of registers or memory locations (e.g. in memories 240 and 242 as shown in FIG. 2) or configured into corresponding hardware comparators to identify which QoS indicator is included in the packet.

The method 400 also includes the network monitoring apparatus 210 maintaining, for each of a plurality of QoS indicator values, a count of the number of packets having the respective QoS indicator value that are received at the network interface card (e.g., a monitoring network interface card 220 or 222 as shown in FIG. 2) (stage 420). In some implementations, the network monitoring apparatus 210 may utilize hardware counters to maintain packet counts of the received packets associated with respective QoS indicator values. The network monitoring apparatus 210 can store the maintained packet counts in a plurality of registers or memory locations (e.g. memory 240 and 242 shown in FIG. 2). The network monitoring apparatus 210 further maintains, for each of a plurality of QoS indicator values, a total volume of network traffic having the respective QoS indicator values received at the monitoring network interface card 220 and 222 (stage 430). For example, the network monitoring apparatus 210 can maintain a hardware counter of the number of bytes or octets of data received at the network interface card. The network monitoring apparatus 210 can store the maintained totals of network traffic volume in a plurality of respective registers or memory locations 240 and 242.

As further shown in FIG. 4, the network monitoring apparatus 210 outputs the packet counts and the total network traffic volumes to a host processor (e.g., a host processor 260 as shown in FIG. 2) (stage 440). In some implementations, the network monitoring apparatus outputs the packet counts and traffic volumes by storing the values in the memory 250 of the network monitoring apparatus 210.

The method 400 further includes the network monitoring apparatus 210 causing the outputted packet counts and total network traffic volumes to be transmitted to a network controller (e.g. the network controller 125 shown in FIGS. 1 and 2) (stage 450). In some implementations, the network monitoring apparatus 210 collects the outputted packet counts and total network traffic volumes from a memory (e.g., a memory 250, as shown in FIG. 2) to be transmitted to a network controller 125. In some implementations, the network monitoring apparatus 210, in response to executing computer executable instructions stored in the memory 250, transmits the outputted packet counts and total network traffic volumes to the network controller 125 via the reporting network interface card 224. In some implementations, the packet counts and traffic volume levels are transmitted to the network controller 125 on a regular basis, for example, every 100 ms, every second, every 10 seconds, or every minute.

Figure 5:
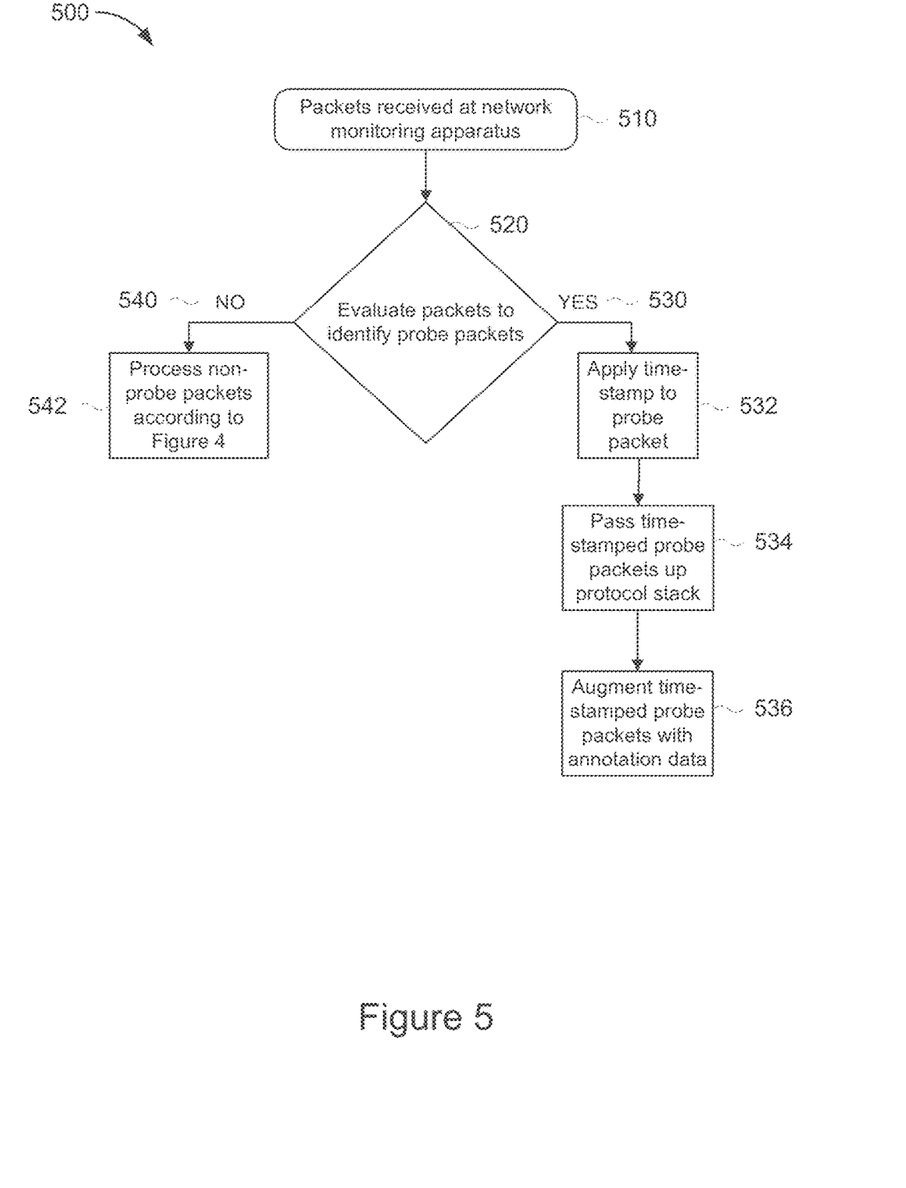
FIG. 5 is a flowchart of a network monitoring apparatus processing probe packets.

FIG. 5 is a flowchart of a method 500 of processing probe packets by a network monitoring apparatus, such as the network monitoring apparatus 210 shown in FIG. 2. The method 500 includes receiving packets at a network monitoring apparatus (stage 510) and evaluating received packets to identify the received packets as a probe packet or as a non-probe packet (stage 520). The method 500 also includes processing identified probe packets (stage 530) and applying time-stamp data to the probe packets (stage 532). The method 500 also includes passing the time-stamped probe packets up the protocol stack of the network monitoring apparatus 210 (stage 534). The method 500 further includes augmenting time-stamped probe packets passed up the protocol stack with annotation data (stage 536). The method 500 further includes processing packets identified as non-probe packets (stage 540) as shown in FIG. 4 (stage 542). In some implementations identified probe packets are also processed according to the method 400 shown in FIG. 4 in addition to being processed as described above and further below.

The method 500 includes receiving packets at a network monitoring apparatus 210 (stage 510). The received packets are evaluated to identify probe packets (stage 520). In some implementations, the network monitoring apparatus 210 extracts select bits, for example, using a bit mask, from received packets and compares the extracted bits to a stored bit pattern to determine whether the packet is a probe packet. In some implementations, the network monitoring apparatus 210 may be further configured to compare the extracted bits from the received packets to a bit pattern stored in memory. The network monitoring apparatus 210 identifies a packet as a probe packet if a positive comparison or match is established between the extracted bits of the received packet and the stored bit pattern. In some implementations, the network monitoring apparatus 210 may further identify probe packets utilizing a hardware comparator. In some implementations, the extracted bits from the packet are the bits located in the protocol identifier field (e.g., field 334 in FIG. 3) or other suitable field of the packet header. In some implementations, the extracted bits are bits located at the beginning or some other suitable defined location within the payload of the received packet.

The method 500 further includes processing the received packet as a probe packet if the packet is identified as a probe packet. Probe packets are processed by having the network monitoring apparatus 210 apply a time-stamp to the probe packet identifying the time at which the probe packet was received by the network monitoring apparatus 210 (stage 532). In some implementations, the time stamp is applied to the probe packet by the integrated circuit processor 230 and 232. The time-stamp data can be used to determine link latencies for the probe packets and to estimate latencies for other packets having the same associated QoS indicator values.

As further shown in FIG. 5, the method 500 also includes the network monitoring apparatus 210 passing the time-stamped probe packet up the protocol stack of the network monitoring apparatus 210 to be transmitted to the network controller 125 (stage 534). By passing the packet up the protocol stack, the packet can be processed by the host processor 260 as described further below. Since only a subset of packets (e.g., probe packets) are passed up the protocol stack, the memory requirements of the network monitoring apparatus are reduced, and the complexity of the operations of the host processor 260 can be increased without unduly increasing the processing load on the host processor 260.

After being passed up the protocol stack, the method 500 includes the host processor 260 of the network monitoring apparatus augmenting the time-stamped probe packets with annotation data (stage 536). For example, the network monitoring apparatus 210 may add a DSCP marking, 802.1pq marking, and/or an indicator as to whether the probe packet was routed using multiprotocol label switching (MPLS) labels. Additionally, or alternatively, the network monitoring apparatus 210 may add the name, descriptions, and/or other labels for the ports, links 160, and switches 110 that the probe packet was most recently transmitted from and destined for. In addition, a packet identified as a probe packet may be augmented with data indicating the time difference between when the probe packet was sent from an upstream switch 110 and when the packet was received at the network monitoring apparatus. Additionally, or alternatively, the probe packet may be augmented with data describing the direction the probe packet was traveling between adjacent switches 110. The annotation data applied to the probe packets by the network monitoring apparatus 210 may be transmitted to the network controller 125 to be utilized in determining an updated routing topology for the network based on network latency. For example, the network monitoring apparatus 210 may aggregate time-stamped, augmented probe packets every 100 ms (or other suitable time period, such as every 10 ms, every second, every 10 seconds or every minute) and transmit the aggregated time-stamped, augmented probe packets to the network controller 125 for use in determining latencies within switches and across paths formed by multiple switches. This latency information can be used by the network controller by itself, or in conjunction with the packet counts and packet volume data output by multiple network monitoring devices 140 across a network environment 100 to calculate an updated network topology. In some implementations the network monitoring apparatus 210 may transmit the aggregated probe packet latency data to the network controller 125 utilizing the reporting network interface card 224 (as shown in FIG. 2).

If a packet is determined not to be a probe packet at stage 520, the method 500 includes the network monitoring apparatus 210 processing the packet as a non-probe packet, as shown in FIG. 4.

Figure 6:
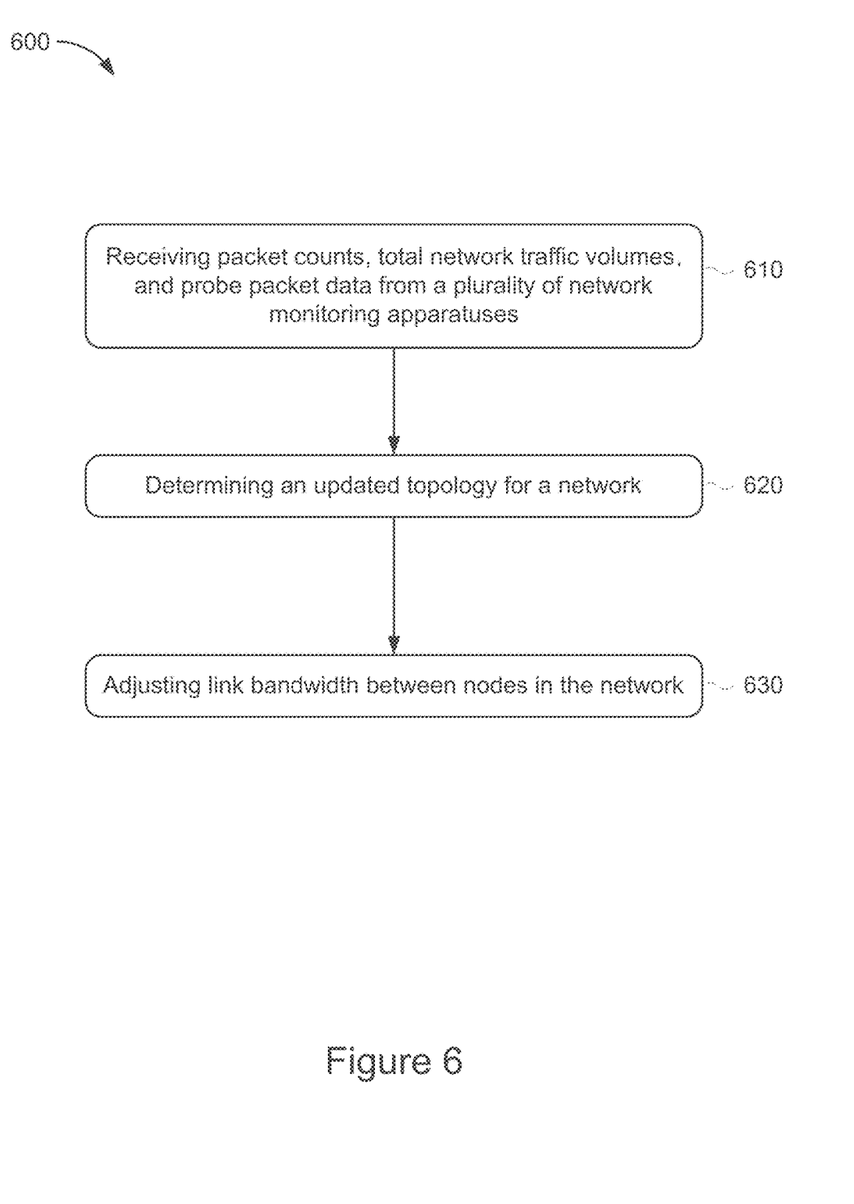
FIG. 6 is a flowchart for a network monitoring system determining an updated routing topology and adjusting link bandwidth between nodes in the network.

FIG. 6 is a flowchart of a method 600 for a network monitoring system determining an updated routing topology and adjusting link bandwidth between nodes in the network. The method includes a network controller 125 receiving packet counts, total network traffic volumes, and probe packet data from a plurality of network monitoring apparatuses 210 (stage 610). The method 600 also includes determining, by the network controller 125, an updated topology for a network (stage 620) and adjusting, by the network controller 125, link bandwidth between nodes in the network (stage 630).

The method 600 includes the network controller 125 receiving the packet counts, total network traffic volumes, and probe packet data (e.g., the aggregated augmented probe packets or data derived therefrom) from a plurality of network monitoring apparatuses 210 (stage 610). The network controller 125 processes the packet counts and total network traffic volumes for each of the respective QoS indicator values associated with the traffic being measured over a link or plurality of links to determine available network capacity on each link.

By analyzing the received probe packet data, the network controller 125 can determine latencies at individual switches within a network environment 100 as well as across entire network paths in the network environment 100. As each probe contains a unique serial number, the time stamps applied to the probe packets at network monitoring apparatus 140 coupled to links 160 on either side of switch can be compared to determine the amount of time it took for the probe packet to pass through the switch. Similarly, time stamps on the probe from the beginning of the probe's path and at the end of the probes path can be used to determine whole-path latencies. The whole path latencies can be used to evaluate a user's quality of experience using the network environment 100.

The method 600 also includes determining, by the network controller 125, an updated topology for a network (stage 620). For example, based on receiving packet counts, total network traffic volumes, and probe packet data from a plurality of network monitoring apparatuses 210, the network controller 125 can apply an optimization algorithm to determine if a different topology would result in improved network performance across one or more traffic types. For example, the packet counts and total traffic values across a link can be used to weight the impact of adjusting the bandwidth across the link or the size of a queue for a particular traffic class at one or more switches. In some implementations, the optimization algorithm uses user experience levels, total switch latencies, numbers of switches or links exceeding performance specifications, average or median available link bandwidth, or any other latency or user experience metric, or some combination of the above parameters, as a cost metric to be reduced in the optimization algorithm.

If the network controller identifies than an alternate topology would reduce the value of the calculated cost metric, the network controller causes the switches 110 in the network to alter the network topology. For example, the network controller 125 can cause one or more switches 110 to adjust link bandwidth between nodes in a network (stage 630). For example, the network controller 125 can cause a switch 110 that employs wavelength division multiplexing, or dense wavelength division multiplexing, to adjust that switch's allocation of transmission wavelengths to one or more of the switch's 110 output ports, to adjust the bandwidth of the links 160 coupled to the switch 110.

As shown FIG. 7 is a block diagram of a computing system 710 suitable for use in implementing the computerized components described herein. In broad overview, the computing system 710 includes at least one processor 750 for performing actions in accordance with instructions, and one or more memory devices 760 and/or 770 for storing instructions and data. The illustrated example computing system 710 includes one or more processors 750 in communication, via a bus 715, with memory 770 and with at least one network interface controller 720 with a network interface 725 for connecting to external network devices 730, e.g., participating in a network (such as the network 100 shown in FIG. 1). The one or more processors 750 are also in communication, via the bus 715, with any I/O devices at one or more I/O interfaces 740, and any other devices 780. The processor 750 illustrated incorporates, or is directly connected to, cache memory 760. Generally, a processor will execute instructions received from memory.

In more detail, the processor 750 may be any logic circuitry that processes instructions, e.g., instructions fetched from the memory 770 or cache 760. In many embodiments, the processor 750 is a microprocessor unit or special purpose processor. The computing system 710 may be based on any processor, or set of processors, capable of operating as described herein. The processor 750 may be a single core or multi-core processor. The processor 750 may be multiple processors.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing device 710 may have any number of memory devices 770.

The cache memory 760 is generally a form of computer memory placed in close proximity to the processor 750 for fast read times. In some implementations, the cache memory 760 is part of, or on the same chip as, the processor 750. In some implementations, there are multiple levels of cache 760, e.g., L2 and L3 cache layers.

The network interface controller 720 manages data exchanges via the network interface 725. The network interface controller 720 handles the physical and data link layers of the Open Systems Interconnect (OSI) model for network communication. In some implementations, some of the network interface controller's tasks are handled by the processor 750. In some implementations, the network interface controller 720 is part of the processor 750. In some implementations, a computing device 710 has multiple network interface controllers 720. In some implementations, the network interface 725 is a connection point for a physical network link, e.g., an RJ 45 connector. In some implementations, the network interface controller 720 supports wireless network connections and an interface port 725 is a wireless receiver/transmitter. Generally, a computing device 710 exchanges data with other network devices 730 via physical or wireless links to a network interface 725. In some implementations, the network interface controller 720 implements a network protocol such as Ethernet.

The other computing devices 730 are connected to the computing device 710 via a network interface port 725. The other computing device 730 may be a peer computing device, a network device, or any other computing device with network functionality. For example, a computing device 730 may be a network device such as a hub, a bridge, a switch, or a router, connecting the computing device 710 to a data network such as the Internet.

In some uses, the I/O interface 740 supports an input device and/or an output device (not shown). In some uses, the input device and the output device are integrated into the same hardware, e.g., as in a touch screen. In some uses, such as in a server context, there is no I/O interface 740 or the I/O interface 740 is not used. In some uses, additional other components 780 are in communication with the computer system 710, e.g., external devices connected via a universal serial bus (USB).

The other devices 780 may include an I/O interface 740, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 710, e.g., a touch screen on a tablet device. In some implementations, a computing device 710 includes an additional device 780 such as a co-processor, e.g., a math co-processor that can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A network monitoring apparatus coupled to an optical communication network, wherein the optical communication network includes a plurality of nodes coupled by optical inter-node communication links, the network monitoring apparatus comprising:
   a network interface card comprising:
      a network port for receiving one end of a network cable corresponding to a monitoring link, wherein another end of the monitoring link is coupled via an optical tap to an optical inter-node communication link between two nodes of the optical communication network and wherein the optical tap is configured to tap an optical signal travelling along the optical inter-node communication link between the two nodes to passively direct a portion of the optical signal along the monitoring link to the network interface card and allow a remainder of the optical signal to pass to an end of the optical inter-node communication link; and
      an integrated circuit processor configured to:
         detect a plurality of quality of service indicator values in headers of packets received at the network port via the monitoring link;
         maintain, for each of the plurality of quality of service indicator values, a count of a number of packets having the respective quality of service indicator value received at the network interface card;
         maintain, for each of the plurality of quality of service indicator values, a total volume of network traffic having the respective quality of service indicator value received at the network interface card;
         identify probe packets received at the network interface card;
         in response to identifying a probe packet, apply a time-stamp to the identified probe packet and pass at least a portion of the time-stamped probe packet up a protocol stack of the network monitoring apparatus; and
         output the packet counts and the total network traffic volumes; and a host processor configured to execute computer executable instructions stored in memory, wherein the computer executable instructions, when executed by the host processor, cause the host processor to:
collect the packet counts and total network traffic volumes output by the network interface card;
aggregate data across a plurality of the time-stamped probe packet portions passed up the protocol stack of the network monitoring apparatus; and
cause the outputted packet counts the total network traffic volumes, and the aggregated data from the time-stamped probe packet portions to be transmitted to a network controller.

2. The apparatus of claim 1, wherein the integrated circuit processor is configured to identify a probe packet received at the network interface card by matching a stored bit pattern to a value in a header field of a received packet.

3. The apparatus of claim 2, wherein the computer executable instructions, when executed by the host processor, cause the host processor to augment the time-stamped probe packet with annotation data.

4. The apparatus of claim 3, wherein the annotation data includes at least one of a quality of service indicator value, a link label, a switch label, or data describing a time-difference between packet transmission from an upstream switch until receipt at the network monitoring apparatus or data describing the direction the probe packet traveled.

5. The apparatus of claim 3, wherein the computer executable instructions, when executed by the host processor, cause the host processor to transmit the augmented, time-stamped probe packet to the network controller.

6. The apparatus of claim 1, wherein the integrated circuit processor is further configured to, in response to receiving a packet via the network port, compare a portion of the packet header to a predetermined set of quality of service indicator values.

7. The apparatus of claim 1, further comprising a plurality of registers or memory locations to store the count of the number of packets and the total network traffic volumes.

8. A system comprising:
an optical communication network including a plurality of nodes coupled by optical inter-node communication links;
a network monitoring apparatus coupled to the optical communication network, the network monitoring apparatus comprising:
a first network interface card comprising a first network port for receiving one end of a first network cable;
a second network interface card comprising a second network port for receiving one end of a second network cable;
each of the first and second network interface cards comprising a respective integrated circuit processor configured to:
detect quality of service indicator values in headers of packets received via the first or second network port, respectively;
maintain, for each of a plurality of quality of service indicator values, packet count and total network traffic volume having the respective quality of service indicator value received at the first or second network interface card, respectively;
identify probe packets received at the network interface card;
in response to identifying a probe packet, apply a time-stamp to the identified probe packet and pass at least a portion of the time-stamped probe packet up a protocol stack of the network monitoring apparatus; and
output the packet counts and total network traffic volumes;
a host processor configured to execute computer executable instructions stored in memory, wherein the computer executable instructions, when executed by the host processor, cause the host processor to:
collect the packet counts and total network traffic volumes output by the first and second network interface cards, respectively,
aggregate data across a plurality of the time-stamped probe packet portions passed up the protocol stack of the network monitoring apparatus; and
cause the outputted packet counts, the total network traffic volumes, and the aggregated data from the time-stamped probe packet portions to be transmitted to a network controller;
a first optical tap coupled to a first optical inter-node communication link and configured to tap a first optical signal travelling along the first optical inter-node communication link to passively direct a portion of the first optical signal along a first monitoring link to the first network interface card of the network monitoring apparatus and allow a remainder of the first optical signal to pass to an end of the first optical inter-node communication link;
a second optical tap coupled to the first optical inter-node communication link or a second optical inter-node communication link configured to tap a second optical signal travelling along the first optical inter-node communication link or the second optical inter-node communication link to passively direct a portion of the second optical signal along a second monitoring link to the second network interface card of the network monitoring apparatus and allow a remainder of the second optical signal to pass to an end of the first optical inter-node communication link or the second optical inter-node communication link; and
a network controller configured to execute computer executable instructions stored in memory, wherein the computer executable instructions, when executed by the network controller, cause the network controller to receive the outputted packet counts and the total network traffic volumes, and to derive based on the aggregated data from the probe packet portions latencies across paths formed by multiple switches in the optical communications network.

9. The system of claim 8, wherein the computer executable instructions when executed by the network controller cause the network controller to determine an updated network topology for the optical communications network based on the received packet counts and total network traffic volumes.

10. The system of claim 9, wherein the computer executable instructions when executed by the network controller, cause the network controller to determine the updated network topology for the optical communication network further based on the derived latency information.

11. The system of claim 9, wherein the computer executable instructions when executed by the network controller, cause the network controller to determine the updated network topology based on timing data associated with probe packets received by the network controller from a plurality of network monitoring apparatuses.

12. The system of claim 9, wherein the computer executable instructions executed by the network controller, cause the network controller to adjust link bandwidth between nodes, based on the determined updated network topology.

* * * * *